United States Patent Office 2,853,490
Patented Sept. 23, 1958

2,853,490

PIPERIDINE DERIVATIVES AND PREPARATION THEREOF

August Hans Lutz and Otto Schnider, Basel, Switzerland, assignors to Hoffmann-La Roche Inc., Nutley, N. J., a corporation of New Jersey No Drawing. Application January 5, 1956
Serial No. 557,455

Claims priority, application Switzerland January 19, 1955

2 Claims. (Cl. 260—294.7)

This invention relates to novel chemical compounds and to novel processes for their preparation. More particularly, the invention relates to novel compounds having the formula (I)
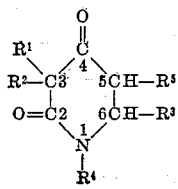

wherein:

$R^1$ and $R^2$ each represents a monovalent radical having not more than four carbon atoms selected from the group consisting of alkyl and alkenyl radicals;

$R^3$ represents a monovalent radical having not more than seven carbon atoms selected from the group consisting of aryl hydrocarbon, aralkyl hydrocarbon, alkyl, alkoxyalkyl and alkenyl radicals; and $R^4$ and $R^5$ each represents a member selected from the group consisting of hydrogen and alkyl radicals having not more than three carbon atoms.

The invention further relates to a novel process of making a compound of Formula I above which comprises condensing a compound having the formula (II)
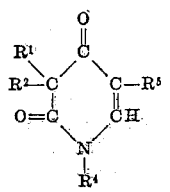

wherein the symbols $R^1$, $R^2$, $R^4$ and $R^5$ have the same meaning indicated above, with an organometal compound having the formula $$R^3—Z$$

wherein:

$R^3$ represents a monovalent radical having not more than seven carbon atoms selected from the group consisting of aryl hydrocarbon, aralkyl hydrocarbon, alkyl, alkoxyalkyl and alkenyl radicals; and Z represents a member selected from the group consisting of lithium and magnesium halide, and hydrolytically decomposing the metal-containing condensation product obtained.

The tetrahydropyridinediones of Formula II above, used as starting materials, can be made by methods which have been disclosed prior to the instant invention: see for instance "Festschrift Emil Barell" (1936), page 195 et seq.; and prior copending application Serial No. 349,564, filed April 17, 1953. The organometal compounds containing the radical $R^3$, referred to above, can also be made by known methods. Suitable organometal compounds are, for example, lithium organic compounds such as phenyllithium; and Grignard compounds, such as aryl-, aralkyl-, alkyl-, alkoxyalkyl- and alkenyl magnesium halides having not more than seven carbon atoms, e. g. methylmagnesium bromide, phenylmagnesium bromide, phenylmagnesium chloride, methoxy-n-butylmagnesium bromide, and the like.

The novel products of the invention, of Formula I above, include solid and liquid materials, which can be purified by crystallization and distillation. The said novel compounds are soluble in the usual organic solvents, and certain of them are also easily soluble in water. The compounds of Formula I are useful as medicinals, in consequence of their activity upon the central nervous system; in particular, said compounds are useful as sedatives and anticonvulsants.

A particularly preferred group among the novel compounds of the invention are those members of the class designated by Formula I above wherein $R^3$ represents a monocyclic hydrocarbon aryl radical; these possess marked anticonvulsant activity. The 3,3-dialkyl-6-phenyl-2,4-dioxo-piperidines included within Formula I above are especially preferred as anticonvulsants.

In instances where the starting material of formula II above is a compound wherein $R^4$ represents hydrogen, it is advantageous to employ approximately two molar proportions of organometal compound per molar proportion of tetrahydropyridinedione starting material, inasmuch as one molar proportion of the organometal compound is bound by the secondary hydrogen atom attached to the nitrogen atom, and a second molar proportion is required for the desired condensation at the ethylenic linkage.

The invention is further disclosed in the following examples, which are illustrative but not limitative thereof.

Example 1

20 g. of lithium was reacted in 1800 ml. of absolute diethyl ether with 230 g. of bromobenzene in known manner to form phenyllithium. 84 g. of 2,4-dioxo-3,3-dimethyl-tetrahydropyridine was dissolved in 1000 ml. of boiling benzene and added to the ethereal solution of phenyllithium, while stirring, and the reaction mixture was then refluxed. The salts which precipitated were decomposed by adding 3 N aqueous hydrochloric acid solution to the reaction mixture. The resulting aqueous layer was separated and discarded. The solvents (benzene, ether) were driven off from the organic layer, and the residue was purified by recrystallization from aqueous methanol. The product thus obtained, 2,4-dioxo-3,3-dimethyl-6-phenylpiperidine, had M. P. 168°–169° C., and was difficultly soluble in water.

Example 2

12 g. of magnesium chips was reacted in approximately 500 ml. of absolute diethyl ether with 83 g. of 4-methoxy-n-butyl bromide. To the resulting solution of Grignard reagent was added a solution of 40 g. of 2,4-dioxo-3,3-diethyl-tetrahydropyridine in 500 ml. of boiling benzene. The reaction mixture was refluxed, and then 3 N aqueous hydrochloric acid was added to a Congo acid end point. The organic layer was separated, washed with 100 ml. of 3 N aqueous sodium hydroxide solution, and dried over sodium sulfate; the solvent was driven off and the residue was distilled in vacuo. The product, 2,4-dioxo-3,3-diethyl-6-(4-methoxy-n-butyl)-piperidine, boiled at 166°–167° C./0.04 mm., and melted at 41.5° C.

Example 3

12 g. of magnesium chips was reacted in 500 ml. of absolute diethyl ether with 50 g. of methyl bromide and the resulting solution was added, while stirring, to a solution of 30 g. of 2,4-dioxo-3,3-diethyl-5-methyl-tetrahydropyridine in 400 ml. of hot toluene. The reaction mixture was refluxed, then was made Congo acid with 3 N aqueous sulfuric acid solution. The organic layer was separated, washed well with 100 cc. of 3 N aqueous NaOH solution, and dried; then the solvent was driven off. The residue was crystallized from a mixture of benzene and petroleum ether. The product, 2,4-dioxo-3,3-diethyl-5,6-dimethyl-piperidine thus obtained melted at 70°–71° C.

*Example 4*

12 g. of magnesium chips was reacted in 500 ml. of absolute diethyl ether with 78 g. of bromobenzene and the resulting Grignard solution was added, while stirring, to a hot solution of 35 g. of 2,4-dioxo-3-ethyl-3-methyl-tetrahydropyridine (M. P. 87° C.) in 800 ml. of dry diethyl ether. Then a 3 N aqueous solution of acetic acid was added until the reaction mixture was acid to litmus, and the organic layer was separated and concentrated. The residue was crystallized from aqueous methanol. The 2,4-dioxo-3-ethyl-3-methyl-6-phenylpiperidine thus obtained melted at 123°–124° C.

*Example 5*

12 g. of magnesium chips was reacted in about 500 ml. of absolute diethyl ether with 50 g. of methyl bromide, and the resulting solution was mixed with a solution of 60 g. of 1-methyl-2,4-dioxo-3,3-diethyl-tetrahydropyridine in 400 ml. of benzene. The mixture was refluxed, and then was set Congo acid with 3 N aqueous sulfuric acid solution. The organic layer was separated, washed with dilute aqueous sodium hydroxide solution, the solvent was driven off and the residue was distilled in vacuo. The product, 1,6-dimethyl-2,4-dioxo-3,3-diethylpiperidine, was obtained as a material boiling at 143° C./10 mm.

The following compounds were prepared by procedures similar to those set forth above:

2,4-dioxo-3,3-di-n-propyl-6-methyl-piperidine, M. P. 970–98° C., from 2,4-dioxo-3,3-di-n-propyltetrahydropyridine and methylmagnesium bromide;

2,4-dioxo-3,3-diethyl-6-allyl-piperidine, M. P. 151°–152° C., from 2,4-dioxo-3,3-diethyl-tetrahydropyridine and allylmagnesium bromide;

2,4-dioxo-3,3-diethyl-6-n-butyl-piperidine, M. P. 50°–51° C., from 2,4-dioxo-3,3-diethyl-tetrahydropyridine and n-butylmagnesium bromide;

2,4-dioxo-1-methyl-3,3-diethyl-6-isopropyl - piperidine, B. P. 91° C./0.01 mm., from 2,4-dioxo-1-methyl-3,3-diethyltetrahydropyridine and isopropylmagnesium bromide;

2,4-dioxo-3,3-dimethyl-6-isopropyl-piperidine, M. P. 152°–153° C., from 2,4-dioxo-3,3-dimethyl-tetrahydropyridine and isopropylmagnesium bromide;

2,4-dioxo-1-methyl-3,3-diethyl-6-phenyl-piperidine, B. P. 143° C./0.04 mm., from 2,4-dioxo-1-methyl-3,3-diethyltetrahydropyridine and phenylmagnesium bromide;

2,4-dioxo-3,3-diethyl-6-isopropyl-piperidine, M. P., 100° C., from 2,4-dioxo-3,3-diethyl-tetrahydropyridine and isopropylmagnesium bromide;

2,4-dioxo-3,3-diethyl-6-benzyl piperidine, M. P. 129°–130° C., from 2,4-dioxo-3,3-diethyl-tetrahydropyridine and benzylmagnesium chloride;

2,4-dioxo-3,3-diethyl-6-methyl-piperidine, M. P. 92°–93° C., from 2,4-dioxo-3,3-diethyl-tetrahydropyridine and methylmagnesium iodide;

2,4-dioxo-3,3,6-triethyl-piperidine, M. P. 70°–71° C., from 2,4-dioxo-3,3-diethyl-tetrahydropyridine and ethylmagnesium bromide;

2,4-dioxo-3,3-diethyl-6-phenyl-piperidine, M. P. 104° C., from 2,4-dioxo-3,3-diethyl-tetrahydropyridine and phenylmagnesium bromide;

2,4-dioxo-3,3-di-n-propyl-5,6-dimethyl-piperidine, M. P. 96° C., from 2,4-dioxo-3,3-di-n-propyl-5-methyl-tetrahydropyridine and methylmagnesium bromide.

We claim:

1. A process which comprises condensing a compound having the formula $$\begin{array}{c} R^1 \\ R^2-C \\ O=C \\ \end{array} \begin{array}{c} O \\ \parallel \\ C \\ \parallel \\ CH \\ \end{array} \begin{array}{c} C-R^5 \\ \\ N \\ | \\ R^4 \end{array}$$

wherein $R^1$ and $R^2$ each represents a monovalent hydrocarbon radical having not more than four carbon atoms selected from the group consisting of alkyl and alkenyl radicals, and $R^4$ and $R^5$ each represents a member selected from the group consisting of hydrogen and alkyl radicals having not more than three carbon atoms, with an organometal compound having the formula $$R^3-Z$$

wherein $R^3$ represents a monovalent radical having not more than seven carbon atoms selected from the group consisting of aryl hydrocarbon, aralkyl hydrocarbon, alkyl, alkoxyalkyl and alkenyl radicals; and Z represents a member selected from the group consisting of lithium and magnesium halide, and hydrolytically decomposing the metal-containing condensation product obtained, thereby producing a compound having the formula $$\begin{array}{c} R^1 \\ R^2-C \\ O=C \\ \end{array} \begin{array}{c} O \\ \parallel \\ C \\ \\ CH-R^5 \\ CH-R^3 \\ \\ N \\ | \\ R^4 \end{array}$$

wherein $R^1$, $R^2$, $R^3$, $R^4$ and $R^5$ each has the same meaning indicated above.

2. A process of making 3,3-dialkyl-6-phenyl-2,4-dioxo-piperidine, wherein each alkyl radical contains not more than four carbon atoms, which comprises condensing 2,4-dioxo-3,3-dialkyl-tetrahydropyridine, wherein each alkyl radical contains not more than four carbon atoms, with approximately two molar proportions of phenylmagnesium halide, and hydrolytically decomposing the magnesium-containing condensation product obtained.

References Cited in the file of this patent

UNITED STATES PATENTS

| | | |
|---|---|---|
| 2,525,231 | Masset | Oct. 10, 1950 |
| 2,680,116 | Frick et al. | June 1, 1954 |

OTHER REFERENCES

Petrenko-Kritshenko: C. A., 18:1485.

Kharasch et al.: Grignard Reactions of Non-metallic Substances, page 1258.

Clarke et al.: "Chemistry of Penicillin," Princeton University Press (1949), page 992, column 1.